United States Patent
Westlake

[11] 3,996,814
[45] Dec. 14, 1976

[54] SPROCKET

[76] Inventor: Glen Edgar Westlake, 403 Bent Crescent, Richmond Hill, Ontario, Canada

[22] Filed: Sept. 13, 1974

[21] Appl. No.: 505,555

[52] U.S. Cl. .............................. 74/243 DR; 74/447
[51] Int. Cl.² ................... F16H 55/30; F16H 55/12
[58] Field of Search .......... 74/243 R, 243 DR, 446, 74/447, 448, 245, 248, 249

[56] References Cited
UNITED STATES PATENTS

| | | | |
|---|---|---|---|
| 568,837 | 10/1896 | Cowen | 74/243 R |
| 623,431 | 4/1899 | Schaefer | 74/243 R |
| 1,683,220 | 9/1928 | Wattie | 74/243 R |
| 1,736,758 | 11/1929 | Ball | 74/243 R |
| 2,365,866 | 12/1944 | Dalrymple | 74/249 |
| 3,108,488 | 10/1963 | Huszar | 74/447 |
| 3,386,718 | 6/1968 | Abbott | 74/448 |
| 3,802,287 | 4/1974 | Graham | 74/243 DR |
| 3,861,232 | 1/1975 | Bravin | 74/446 |

*Primary Examiner*—Samuel Scott
*Assistant Examiner*—Allan R. Burke

[57] ABSTRACT

A sprocket having interchangable teeth, in which a chain is removably mounted circumferentially on the peripheral edge portion of a hub, with means to key the chain both longitudinally and laterally on the edge portion of the hub. Each link of the chain carries one or more teeth which project radially outward with respect to the hub.

6 Claims, 6 Drawing Figures

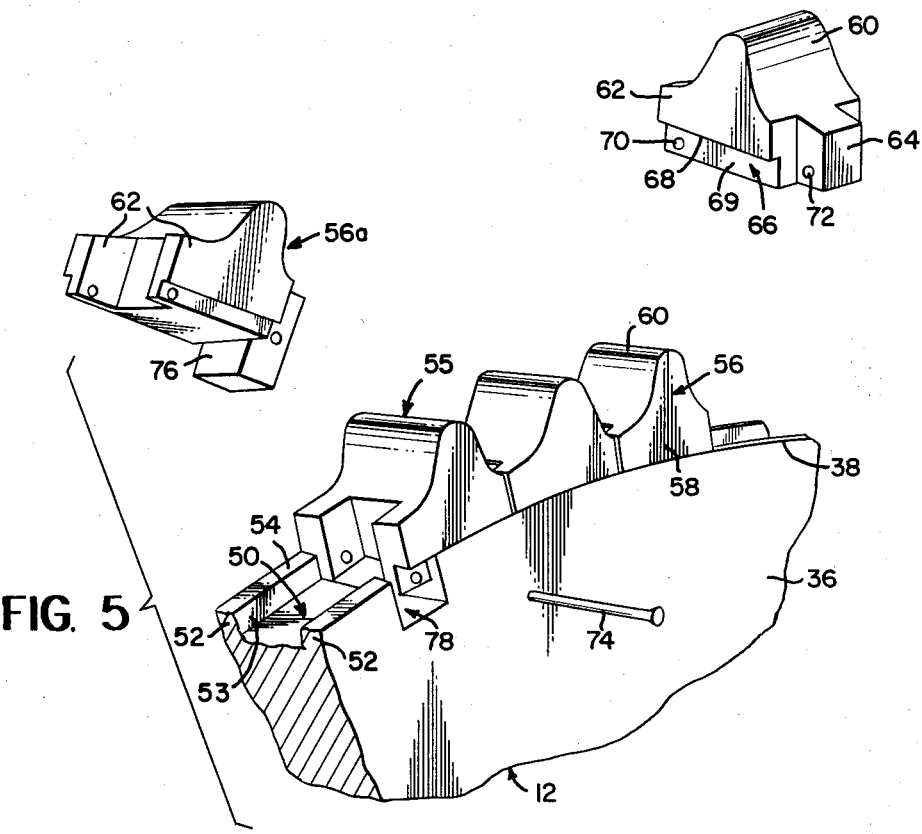

SPROCKET

This invention relates to sprockets.

Sprocket wheels are machined in various diameters and pitches to meet particular requirements. When the teeth become worn on a sprocket wheel the wheel must be replaced. In these times when materials and skilled workmanship are both scarce, breakage of a sprocket wheel or wear on the teeth causes undue delays in production output while a replacement is being sought and machined.

The present invention provides a sprocket wheel assembly with interchangable teeth.

In its broadest aspect the invention consists of a sprocket with interchangable teeth, comprising: a hub having means centrally disposed thereon for mounting the hub on a shaft, and having a circumferential outer edge portion; a plurality of links pivotally connected in series to form a endless chain lying circumferentially against the outer edge portion of the hub, each of said links carrying at least one tooth projecting radially outward with respect to the hub, the chain being disconnectable for removal from the hub; and means to key the chain longitudinally on the hub and means to key the chain laterally in the hub.

This invention also resides in a chain for use with a hub to form such a sprocket.

An example embodiment of the invention is shown in the accompanying drawings in which:

FIG. 5 is a fragmentary, perspective view similar to FIG. 3 showing an alternate embodiment of the invention; and FIG. 6 is a perspective view of one link of the sprocket chain of FIG. 5.

Figure 1:
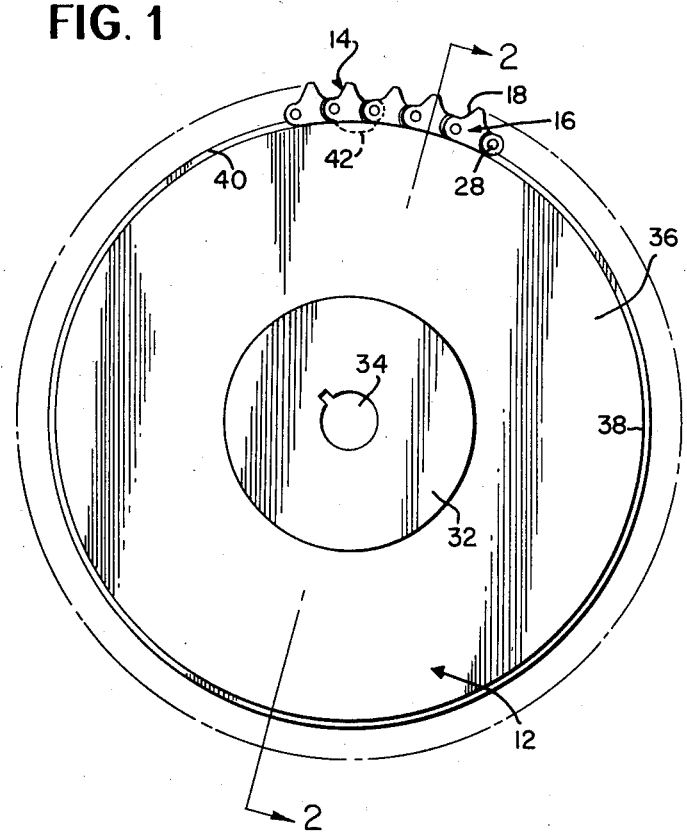
FIG. 1 is a side view of a sprocket wheel according to the invention.

The example embodiment shown in the drawings consists of a sprocket 10 comprising a hub 12 and a chain 14 circumscribing the hub. Chain 14 comprises a plurality of links 16 each having a central body portion 17 with an upstanding tooth 18. Each link 16 has a pair of spaced flanges 20 extending from one end of the link, each with an aperture 22, and a boss 24 extending from the other end of the link with an aperture 26. Flanges 20 of one link 16 accomodate boss 24 of the next adjacent link with apertures 22 and 26 aligned to receive a rivet pin 28 pivotally attaching the links together. The underside of each link 16 is recessed to form a continuous longitudinal channel 30 in chain 14.

Figure 2:
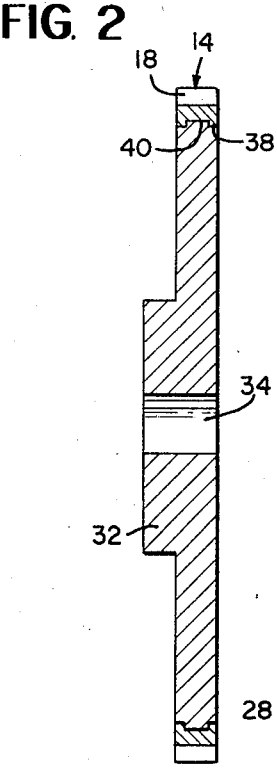
FIG. 2 is a cross-sectional view taken along line 2-2 of FIG. 1.
Figure 4:
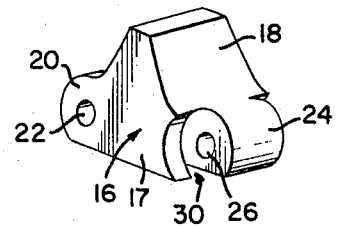
FIG. 4 is a perspective view of one link of the sprocket chain of FIGS. 1 to 3.

Hub 12 comprises a central boss 32 with an axial bore 34 to receive a shaft and a radial flange portion 36 terminating in a circumscribing free edge 38 which has a centrally located longitudinal rib 40 also circumscribing the hub and of a width to be received in channels 30 of links 16. As seen particularly in FIGS. 2 and 3, chain 14 lies along free edge 38 of radial flange 36 with rib 40 lying in channels 30 of links 16, the length of chain 14 being chosen to match the circumference of hub 12.

Figure 3:
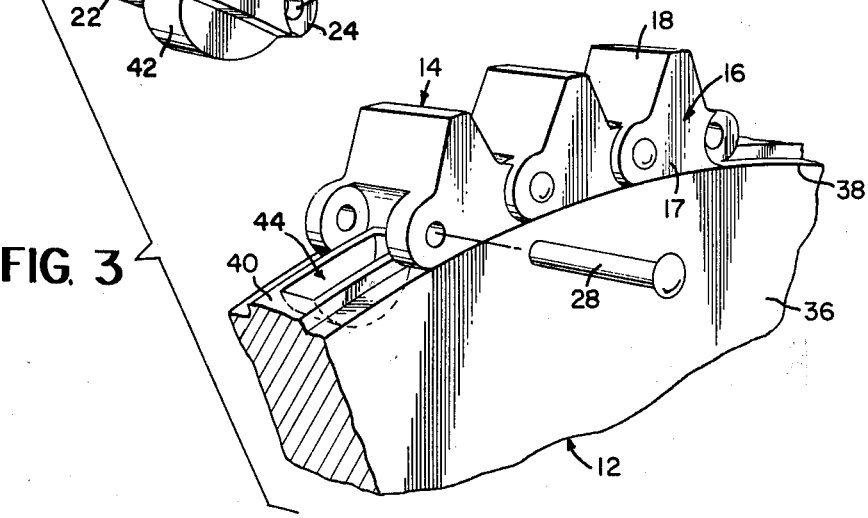
FIG. 3 is a fragmentary, perspective view of the sprocket wheel of FIG. 1 showing the keying structure.

As seen in FIG. 3, one link 16a of chain 14 has a key 42 extending downwardly from channel 30 and receivable in a recess 44 in rib 40 of hub 12 to prevent the chain from slipping longitudinally on the hub.

It will be appreciated that each link 16 may carry more than one tooth 18 and each tooth may be of any convenient shape as in conventional sprocket wheels now in use. Also each link 16 may ride on free edge 38 of hub 12 in any convenient manner to prevent lateral slippage; for example rib 40 may be eliminated and the free edge of the hub itself may be received in channels 30 of chain 14. Of course hub 12 may be of any suitable construction to provide an axial bore 34 and a circumferential free edge 38.

It will be seen that the structure of sprocket 10 according to the invention allows teeth 18 of the sprocket to be replaced when damaged or worn, without the need even to remove hub 12 from its mounting shaft. An assortment of chains 14, teeth 18 of different pitches and profiles, may be kept as inventory for immediate use. One link 16 of each chain 14 may be used as a master link with its pin 28 removable by tapping to mount the chain on hub 12 and to remove it from the hub. The length of each chain 14 may of course be varied by adding or removing one or more links 16.

To establish a pitch on claim 14, links 16 may be placed on rib 40 with apertures 22 drilled in flanges 20 but without aperture 26 drilled in boss 24. A drive chain for sprocket 10 is then placed around the sprocket to engage each tooth 18 to determine the pitch of the teeth, whereupon apertures 26 may be drilled in bosses 24 and rivets 28 inserted to form chain 14.

While the invention is described for a sprocket it will be appreciated that it could be used as a gear.

In the alternate example embodiment of the invention shown in FIGS. 5 and 6, free edge 38 of flange 36 carries a channel 50 having side walls 52 circumscribing hub 12 with inner faces 53 and free edges 54. A chain 55 circumscribes hub 12 and comprises a plurality of links 56 each having a central body portion 58 with an upstanding tooth 60. Each link 56 has a pair of spaced flanges 62 extending from one end of the link and a boss 64 extending from the other end of the link. Central body portion 58 and flanges 62 are stepped inwardly along their lower, outer portions to form a groove 66 on each side of link 16 with a shoulder 68 and a side face 69.

Aligned apertures 70 are located in flanges 62 in grooves 66 and an aperture 72 is located in boss 64. Flanges 62 of one link 16 accommodate boss 64 of the next adjacent link with apertures 70 and 72 aligned to receive a flat-headed rivet pin 74 pivotally attaching the links together. Apertures 70 and 72 are countersunk.

Chain 55 is placed on hub 12 to have shoulders 68 of grooves 66 rest on the free outer edges 54 of side walls 52 and side faces 69 of the grooves lie adjacent the inner faces 53 of the side walls.

As seen in FIG. 5, one link 56a of chain 55 has a key 76 extending downwardly from boss 64 and receivable in a keyway 78 in channel 50 to prevent the chain from slipping longitudinally on the hub. This allows the master pin (one of pins 74) to be inserted in apertures 70 and 72 of adjacent links 56.

It will be appreciated that grooves 66 of links 56 may be eliminated and chain 55 may rest in channel 50, the links resting on the bottom of the channel. Also, rivet pins 74 may be held in links 56 by side walls 52 of channel 50. Of course it may be desirable to use more than one key 42 or 76 on a given chain 14 or 55.

I claim:

1. A sprocket having interchangeable teeth, comprising:
   a hub having means centrally disposed thereon for mounting the hub on a shaft, and having a circumferential outer edge portion;
   a plurality of unitary links pivotally connected in series to form an endless chain circumscribing the hub and lying circumferentially against the outer edge portion of the hub, each of said links carrying at least one tooth projecting radially outward with respect to the hub, the chain being disconnectable for removal from the hub;
   means to key the chain laterally on the hub, said lateral keying means comprising a recess longitudinally disposed in each of said links on that side of the link lying against the outer edge portion of the hub to form a continuous channel in the chain and an upstanding rib circumferentially disposed on the outer edge portion of the hub, the rib of the hub being received in the channel of the chain; and
   means to key the chain longitudinally on the hub.

2. A sprocket as claimed in claim 1 in which the longitudinal keying means comprises a key integral with one of said links and projecting radially inward therefrom with respect to the hub and a recess in the hub receiving the key therein.

3. A sprocket as claimed in claim 1 in which each link comprises a central body portion having a pair of parallel, spaced, apertured flanges extending from one end thereof and an apertured boss extending from the other end thereof, the boss of one link being receivable between the flanges of the next succeeding link whereby the aperture in the flanges and in the boss are aligned.

4. A sprocket having interchangable teeth, comprising:
   a hub having means centrally disposed thereon for mounting the hub on a shaft, and having a circumferential outer edge portion;
   a plurality of unitary links pivotally connected in series to form an endless chain circumscribing the hub and lying circumferentially against the outer edge portion of the hub, each of said links carrying at least one tooth projecting radially outward with respect to the hub, the chain being disconnectable for removal from the hub;
   means to key the chain laterally on the hub, said lateral keying means comprising a channel disposed circumferentially in the outer edge portion of the hub defined by a pair of spaced side walls, each of said links resting in said channel between said side walls; and
   means to key the chain longitudinally on the hub, where each link comprises a central body portion having a pair of parallel, lateral keying means comprising a recess longitudinally disposed in each of said links on that side of the link lying against the outer edge portion of the hub to form a continuous channel in the chain and an upstanding rib circumferentially disposed on the outer edge portion of the hub, the rib of the hub being received in the channel of the chain.

5. A sprocket as claimed in claim 4 in which the longitudinal keying means comprises a key integral with one of said links and projecting radially inward therefrom with respect to the hub and a recess in the hub receiving the key therein.

6. A sprocket as claimed in claim 4 in which each link includes a pair of opposed lateral faces and a bottom portion, a longitudinal groove in each lateral face of each link, each of said grooves having a downwardly facing shoulder, said shoulders resting on the side walls of the channel.

* * * * *